United States Patent [19]
Cok

[11] Patent Number: 4,910,611
[45] Date of Patent: Mar. 20, 1990

[54] METHOD FOR DOING INTERACTIVE IMAGE PROCESSING OPERATIONS ON LARGE IMAGES

[75] Inventor: David R. Cok, Rochester, N.Y.
[73] Assignee: Eastman Kodak Company, Rochester, N.Y.
[21] Appl. No.: 293,792
[22] Filed: Jan. 5, 1989
[51] Int. Cl.⁴ .............................................. H04N 1/387
[52] U.S. Cl. ..................................... 358/453; 353/452
[58] Field of Search ............... 358/260, 280, 452, 453; 364/518, 514

[56] References Cited
U.S. PATENT DOCUMENTS
4,805,138 2/1989 Ochi et al. ........................... 358/453

Primary Examiner—Edward L. Coles, Sr.
Attorney, Agent, or Firm—Edward Dugas

[57] ABSTRACT

A method of performing interactive image processing of a digital image with a digital computer by:
1. forming a sequential order operations file of each operation that is to be performed on a digital image;
2. determining which pixels of the digital image must be computed (operated) upon in order to obtain a desired output image by processing through the operations log in a reverse sequential order;
3. ordering the computation of the determined pixels in a way which minimizes the amount of computer memory needed by forming chunks of dependent pixels and by calling from memory only those chunks which are needed for the final result and by deleting used chunks when they are no longer needed; and
4. processing through the operations file in sequential order.

10 Claims, 5 Drawing Sheets

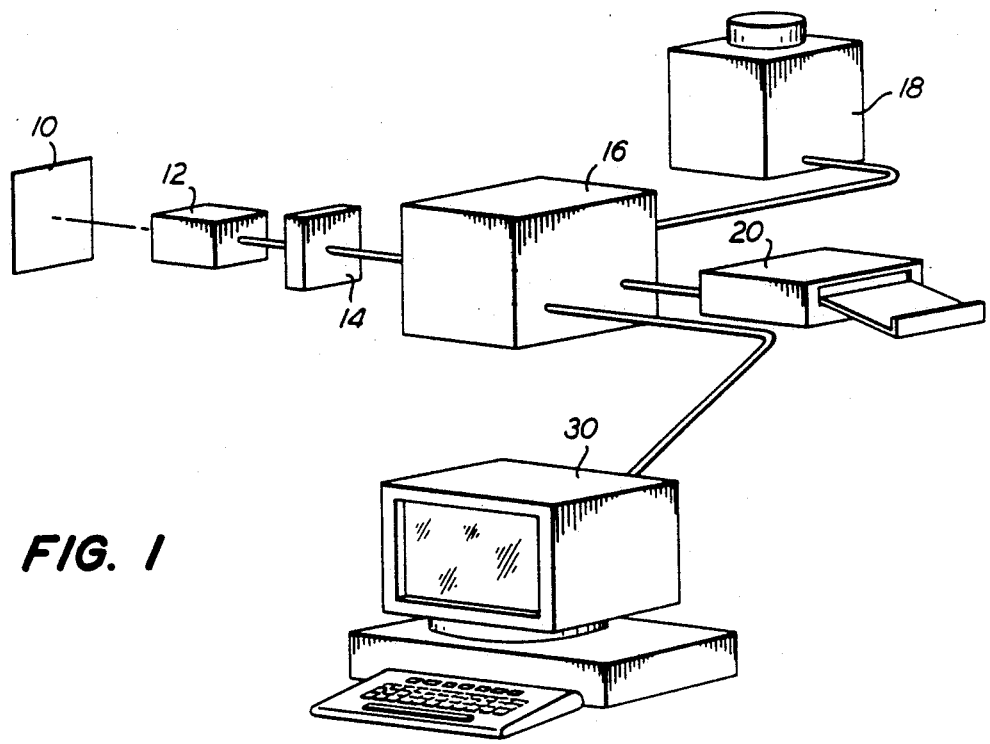
FIG. 1
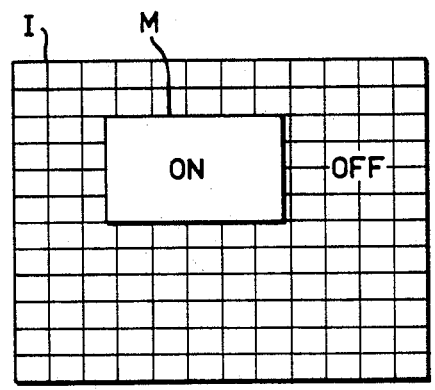
FIG. 2
FIG. 3

METHOD FOR DOING INTERACTIVE IMAGE PROCESSING OPERATIONS ON LARGE IMAGES

TECHNICAL FIELD OF THE INVENTION

The present invention is directed to a method of performing interactive image processing and, more particularly, to a method for processing images which are too large to fit into computer memory and for which the time to move the image to and from a disk memory will be substantial.

BACKGROUND OF THE INVENTION

As computers become more powerful and the techniques of converting photographic images to and from digital form are able to reproduce images of professional photographic quality, there is an increasing need for computer based workstations which are able to interactively perform image editing and image processing operations on such digitized images. However, professional quality images are very large in terms of the amount of digital data and current computer equipment cannot perform even simple computations on such images in a time reasonable for interactive processing.

The prior art contains examples of products which provide a suite of user operations and give interactive performance for some of those operations. Other operations will take a long time (as long as an hour or two) to complete; the operator cannot do any other operations in the meantime.

One such system is disclosed in European Pat. No. EP 0112 414 A1 entitled "Image Transformations on an Interactive Raster Scan or Matrix Display" by R. L. A. Cottrell.

The interactive raster-scanned display device of that patent uses alternative images which are substituted for the full image. An alternate image contains considerably less detail to be drawn and erased than the full image it replaces.

Other known systems edit images by selecting (extracting) a portion of the scene to be operated upon, which portion is then reinserted back into the full scene. See, for example, U.S. Pat. No. 4,189,744, entitled "Apparatus for Generating Signals Representing Operator-Selected Portions of a Scene" by G. Stern, and U.S. Pat. No. 4,746,980, entitled "Video Processing System" by A. C. Petersen.

The present invention is based on the scheme of operating on a large image in sections to minimize the user's wait time for completing selected operations.

SUMMARY OF THE INVENTION

This invention discloses a means of providing interactive operation for all image processing operations, including ones which are heavily interactive, such as brushing, in which the user selects pixels or areas to be modified by using an interactive pointing device such as a computer "mouse." This is accomplished by the method described below.

1. All user operations are sequentially recorded in a log in a way that permits the complete operation to be performed exactly as it was specified. For some operations this is straightforward: a ROTATE operation is specified by an angle, a RESIZE operation is specified by a new width and height. Others involve the specification of colors (3-color components) or ranges of colors. Some operations which involve hand drawn actions on the user's workstation will require a potentially large data array containing the path the user traced or a list of pixels that were affected.

2. At any given time in the user's editing of an image, he is presented with a display of a portion of an image. This may be a small portion of the complete (large) image shown at full resolution (one screen pixel per image pixel), or it may be a sub-sampled version of a larger area of the image (one screen pixel per many image pixels). The problem is how to compute and display updated versions of the image as the user adds operations to the operations log. In principle, one can take the original data, as stored, for example, on computer disk, and apply each operation in turn from the log to the complete image, arriving at the final image, and displaying the appropriate portion. This would require a large amount of computer memory or would necessitate considerable movement of data to and from disk. Another approach is the following:

Each operation in the operations log has as its inputs original data or the results of previous operations in the log. Each operation is mathematically specified, so it can be determined for each operation, given a description of a group of pixels of its result, what group of pixels of each of its inputs is needed in order to compute the result. In practice, it is convenient to describe groups of pixels as rectangles, but more general shapes can also be used.

Proceeding as follows:

(2a) Determine what portion of the final image is to be displayed.

(2b) Proceed through the operations log in the reverse direction, determining for each operation which pixels of the inputs are needed to give the needed pixels for the output. Note that the result of an operation may be used as input for more than one future operation. Thus, the groups of pixels needed from that image will be the union of the groups needed for input for each individual later operation.

(2c) Proceed through the operations log in the forward direction. For each operation compute only that group of pixels which will be needed for later operations. Thus, redundant computations are avoided, but all the pixels needed for the final result are computed.

3. The approach outlined above avoids redundant computations, but in situations where the amount of computer memory is limited, the size of intermediate groups of pixels which are kept during computation may exceed the memory capacity of the computing device. Improved performance results when the procedure outlined above is modified as follows:

(3a) The output of each operation is a group of pixels of the image which represents all the operations thus far in the log. Divide these pixels into smaller groups, called chunks. In the same way that dependencies of pixels on pixels of previous images were established by using the definition of each operation, dependencies of chunks on previous chunks can also be established.

(3b) The chunks can be computed in any order desired, without reference to which intermediate image they are part of; the only requirement is that if chunk A depends on chunk B (in that pixels of B are needed to compute A) then chunk B must be computed before A. The computation of chunks can be ordered in any way which satisfies this constraint. The ordering is free to optimize other considerations such as the maximum amount of memory which is needed to compute the final result.

(3c) The ordering of chunks before any computation is started accomplishes another purpose. By knowing which future chunks a given chunk supplies, one can determine when the chunk is no longer needed, and hence when it can be deleted, releasing its memory space for other results. In a typical computer, system, the future use of data is unknown and is estimated based on how recently it was used: data used least recently is presumed to be needed the furthest in the future. In this invention additional information about the use of data is known and so can be used to improve on the least recently used algorithm.

4. In a situation where the user is looking at one area of an image while incrementally adding operations to the operations log, it is also advantageous to retain the computed data after displaying the image, in order to avoid recomputing it from original data when the user requests a modified view.

A further advantage of this method of computing the data to be shown interactively to a user of an image editing or processing system is that the same computational means can be used to compute the full image at some time after the interactive session is completed. It is customary to have this post-processing step in workstations of the sort discussed herein because with any current system of software and hardware the computation of a full image takes a significant amount of time. The method presented above will accomplish this final computation while minimizing the amount of computer memory which is needed to hold intermediate results, as stipulated in step (3b).

In summary, the present invention is a method for computing the images to be presented to a user during an interactive session and for computing the final image which would be stored for later use or exposed on some photographic output device. It is comprised of the steps of:

(1) recording the specifics of each operation the user performs;

(2) determining which pixels of the input, intermediate and final images, must be computed in order to obtain the output image; and (3) ordering the computation of those pixels in a way which minimizes the amount of computer memory required, while avoiding recomputation of previous results.

This method results in improved performance because item 1 avoids having any operations which must be applied to the full image before another operation can be applied during an interactive session; item 2 avoids computation of pixels which are not needed for display, and item 3 avoids unnecessarily transferring information to or from an auxiliary storage device. The basic method and associated improvements apply both to interactive computations and to computations performed on the full image after the interactive session.

The above description has been in terns of a general purpose computer with auxiliary storage such as a disk. The same method applies to computations performed on a special purpose computing device which may be attached to a general purpose computer.

From the foregoing it can be seen that it is a primary object of the present invention to provide a user with an improved method for interacting with large digital images.

It is another object of the present invention to recall only portions of an image from archival storage which are needed for an interactive operation.

Another object of the present invention is to avoid operations which must be applied to the full image before any subsequent operations can be applied.

Yet another object of the present invention is to avoid unnecessary transfers of information to or from an auxiliary storage device.

Yet a further object of the present invention is to provide a method for computing the final and intermediate images, piece-by-piece, and for planning the order of those pieces so that disk transfer time and intermediate memory requirements are small.

These and other objects of the present invention will become more apparent when taken in conjunction with the following description and drawings wherein like characters indicate like parts, and which drawings from a part of this application.

BRIEF DESCRIPTION OF THE DRAWINGS

FIG. 1 illustrates an imaging system which may be used to implement the method of the present invention.

FIG. 2 illustrates an array of pixels corresponding to an image and indexed with x and y coordinate values.

FIG. 3 illustrates a mask positioned on the array of pixels of FIG. 2.

DESCRIPTION OF THE PREFERRED EMBODIMENT

Figure 4:
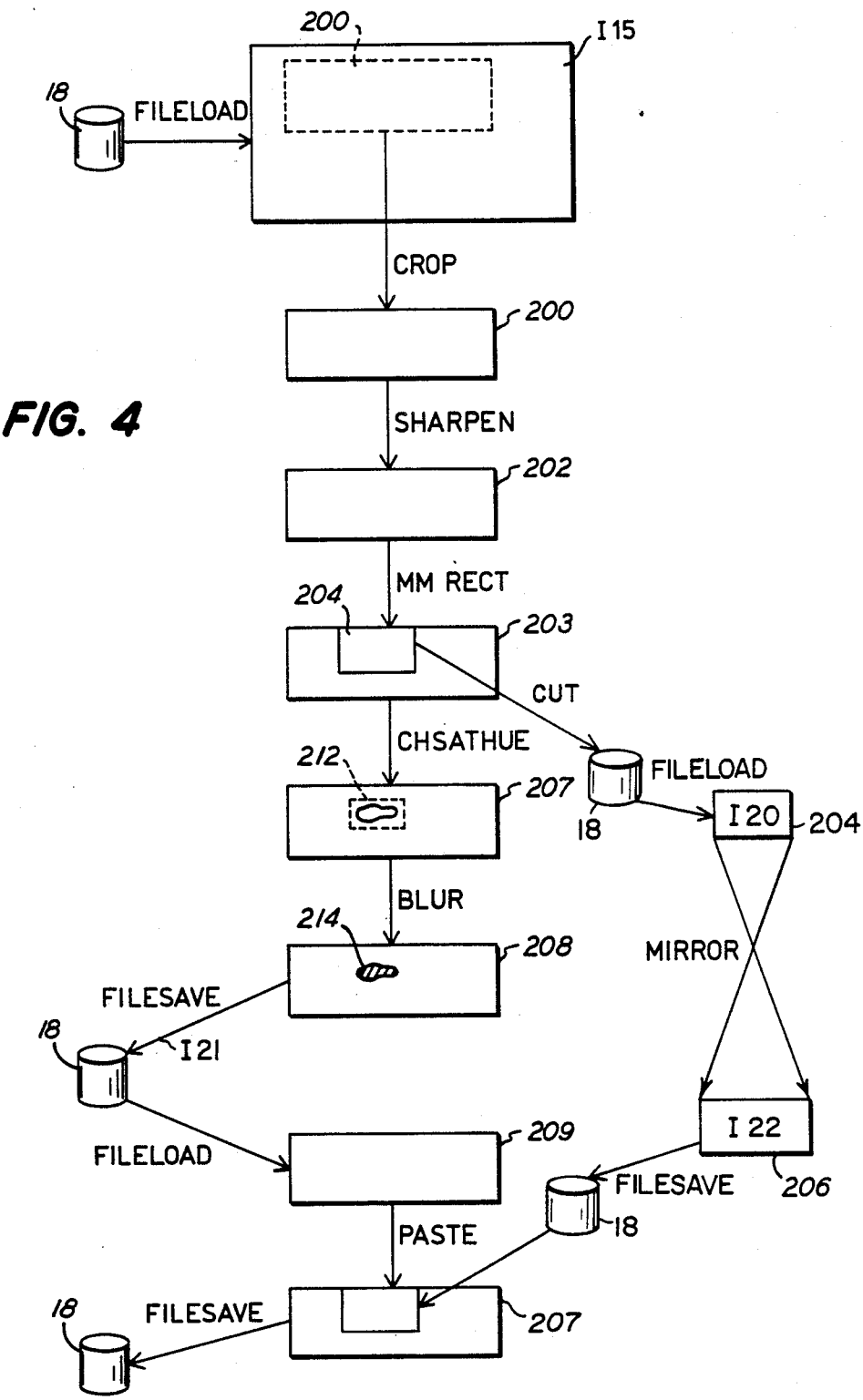
FIG. 4 is a flow diagram illustrating an example of an operation log in accordance with the present invention.

A basic system of an interactive image processor on which the present invention is implemented is illustrated in FIG. 1. Such systems are well known in the art. The basic components of such a system are an image scanner 12 for converting an image 10 into electrical signals which may be analog or digital in nature. If analog signals are generated by the image scanner 12, an analog-to-digital converter 14 is used to provide digital signals which are used by a processor 16. The processor contains memory, ALU, temporary registers and control circuitry for operating the processor under software and user control. Expanded memory is provided with a disk memory 18. A terminal 30 provides the user with visual information and a keyboard through which user information is directed to the basic system. Additional input devices can supplement the user keyboard. These devices may be, for example, a mouse, light pen and pad or joystick for controlling a cursor.

A printer 20 is connected to the processor 16 and to the terminal 30 for receiving a processed digital image from the processor and for printing a hard copy of the image.

As an introduction to the operation of the system with the present method, we first start with an image, that because of its size, either cannot be totally held in memory or if it can, is of such a size that operations performed on the whole image cannot be completed quickly enough to give reasonable response to the user. Consequently, operations requested by the user will be performed only on the portions of the image that are needed to create the display on the CRT of the terminal.

I. USE OF POST-PROCESSING AND THE LOG-FILE

The image is loaded into the processor 16 either from disk memory 18 or from some initial image scanned by the image scanner 12. The operator would then perform various operations such as color changes, pasting in pieces from other images, cutting out pieces from the working image to be modified and pasted back in or to be saved as separate images on disk. At any time there may be a few working images as well as masks associated with those images for the software to maintain. During the session the operator may request that various images or masks be saved as disk files. Finally the session will be terminated. This environment allows for multiple image inputs and outputs during one session and for multiple working images (within the processor 16) to be active during a session. The operator could have, for example, two working images (or image buffers) active and switch between them to adjust some property, such as color balance, to be the same before pasting them together.

At the termination of the session, the only processing which has actually been performed on the original image files is that which is needed to create the display. All the requested operations are entered in an operations log-file. Of course some image processing has to be done in order to present the user with visual feedback-that is, to show on the CRT display a representation of what he requested to be performed. This brings up the first use of the operations log-file. There will not be sufficient computer memory to keep all of even a sub-sampled image in memory, nor will there be sufficient time to keep a complete image up-to-date (not to mention multiple image buffers). So only part of the active images will be kept up-to-date. The amount which can be maintained will depend on the hardware configuration. The current method calls for only the portion of the image which is actually being displayed (the "view") to be kept up-to-date. When a new operation is requested, the view is updated from the previous version of the view. However, if the user pans to a different part of the image or to a different image buffer, there is not an up-to-date result to display. In this case the view is calculated from the original images using the operations log-file to determine what must be computed to yield the desired display.

A second use of the invention is to actually do the computation to produce the full result image files. This is called post-processing and is done non-interactively, while the system is inactive or while the operator is working on other images. The request would be simply to process the log-file, creating all the images that the operator requested to be saved during the work session.

A third scenario is that the operator suspended the work session, intending to resume work later. In this case he would request to resume work with that log-file. Current views are then calculated from the log-file and new operations are appended to it.

A fourth, related, use is that the operator suspended the work session, intending to resume work later, but wishes to have some of the processing performed in the meantime. This is very similar to the normal post-processing, except that, if this is to be equivalent to the scenario in the previous paragraph, the complete state of the work session must be computed and saved. This includes all masks which are active at the time work was suspended.

The different uses of the log-file require that when the log-file is used for processing, one must specify what result is to be computed. If it is being used for view generation, only the current view need be computed. If it is used for final post-processing, only the images which were designated to be saved need to be computed. If it is used to catch up to the current point in a suspended work session, all current images and masks (as well as anything saved along the way) must be computed. In other words, in the sense of a demand-driven computation, one must specify the external demand, so that only the computations needed to satisfy that external demand need to be performed and not other ones.

II. TERMINOLOGY

This section summarizes the terminology and assumptions underlying the present method.

1. Image-Referring to FIG. 2, an image I is taken be an array of pixels of some shape contained in some bounding rectangle of some width and height (number of pixels and lines), where the pixels are indexed from left to right with an x-coordinate beginning at 0 and ending at m, and the lines are indexed from top to bottom with a y-coordinate beginning at 0 and ending at n. The shape of the image may be specified in many ways, such as by a bit-mask or by a geometric description, but it must not be difficult to determine, given x and y coordinates, whether that pixel is within the image.

2. Masks-Referring to FIG. 3, images may have masks M associated with them which may be used to indicate the shape of an image or to indicate the strength of an operation to be applied to the image. A mask value of 0 or off generally indicates the absence of an image or not applying an operation at that pixel. Masks may be binary-valued (off or on), or they may have a number of discrete levels (such as 256). Values between 0 and the maximum value (the on value) are neither off nor on. Generally speaking, mask values are not known without actual computation of the mask. However, it may be that certain regions of the mask are known to be off and certain other regions are known to be on; the remaining regions are termed unknown. Obviously, one could label the whole mask as unknown, but the processing may be much more efficient if additional information can be supplied. For example, if a mask is generated from a geometric shape or a boundary, or is a combination of a geometric shape of boundary with a color range, a bounding rectangle can be defined outside of which the mask is known to be off. In that area an operation which uses that mask will have no effect and thus the image data can be copied without modification from source to result. A region of a mask is "not known to be off" if it is either unknown or known to be on; similarly it is "not known to be on" if it is unknown or known to be off.

3. Operations log-(See, OPERATIONS LOG EXAMPLE) Each log entry represents a complete specification of a basic operation to be performed on the image. This includes an indication of which image(s) the operation acts on, what the parameters are for the operations, what region or mask is to be used for the operation and so forth. The result of the operation is generally a new image or mask. Examples of operations might be "CROP image I4 to a width of 950 pixels and height of 200 lines, beginning at pixel 50, line 10" or "PASTE image I1 into image I6 at pixel 1500, line 2000" or "SHARPEN image I5 using mask M2 and the default kernel." In this last example the mask may have been generated by the use of an interactive brush and would indicate which pixels are to be sharpened and the strength of the sharpening to be applied. An image or mask consists of chunks (see chunk definition) which are rectangular sections of the image.

| OPERATIONS LOG EXAMPLE | | | | | |
| --- | --- | --- | --- | --- | --- |
| FILELOAD | II=I5 | | | | |
| CROP | XP=50 | YP=10 | IW=950 | IH=200 | |
| SHARPEN | MI=M1 | ST=3 | | | |
| MMRECT | MI=M3 | XP=50 | YP=0 | MW=300 | MH=100 |
| CUT | MI=M3 | II=I20 | | | |
| CHSATHUE | MI=M1 | SC=110 | HC=0 | | |
| MMBRUSH | MI=M4 | XP=80 | YP=30 | MW=200 | MH=80 BR=1 |
| BLUR | MI=M1 | ST=2 | | | |
| FILESAVE | II=I21 | | | | |
| FILELOAD | II=I20 | | | | |
| MIRROR | MO=HFLIP | | | | |
| FILESAVE | II=I22 | | | | |
| FILELOAD | II=I21 | | | | |
| PASTE | MI=M1 | II=I22 | XP=330 | YP=0 | |
| FILESAVE | II=I30 | | | | |

4. Operations-Operations may occur in any order in the log-file and will be applied in the order in which they are specified. Although it is sometimes possible to combine successive operations into one composite operation, in practice only a very few operations can actually be interchanged and still give strictly the same result. Even a subtraction of 10 units from luminance followed by adding 10 units to luminance is not the same as first doing the addition and then the subtraction (nor as no change at all). This is because the luminance values, for example, are represented with a finite amount of precision, say 8 bits. A value of 250 will be saturated at 255 after the addition of 10 units. In some cases the combined or interchanged operations will give a reasonable approximation to the precise result, one that may be acceptable in order to decrease computation time. In other cases the combined or interchanged result may be closer to what the user intended and is the desired result.

It must be possible to determine from the specification of the operation what the size of the resulting image is, without computing pixel values. It must also be possible to determine which pixels of previous images and masks may be needed to compute this image without computing image or mask pixel values.

Figure 5:
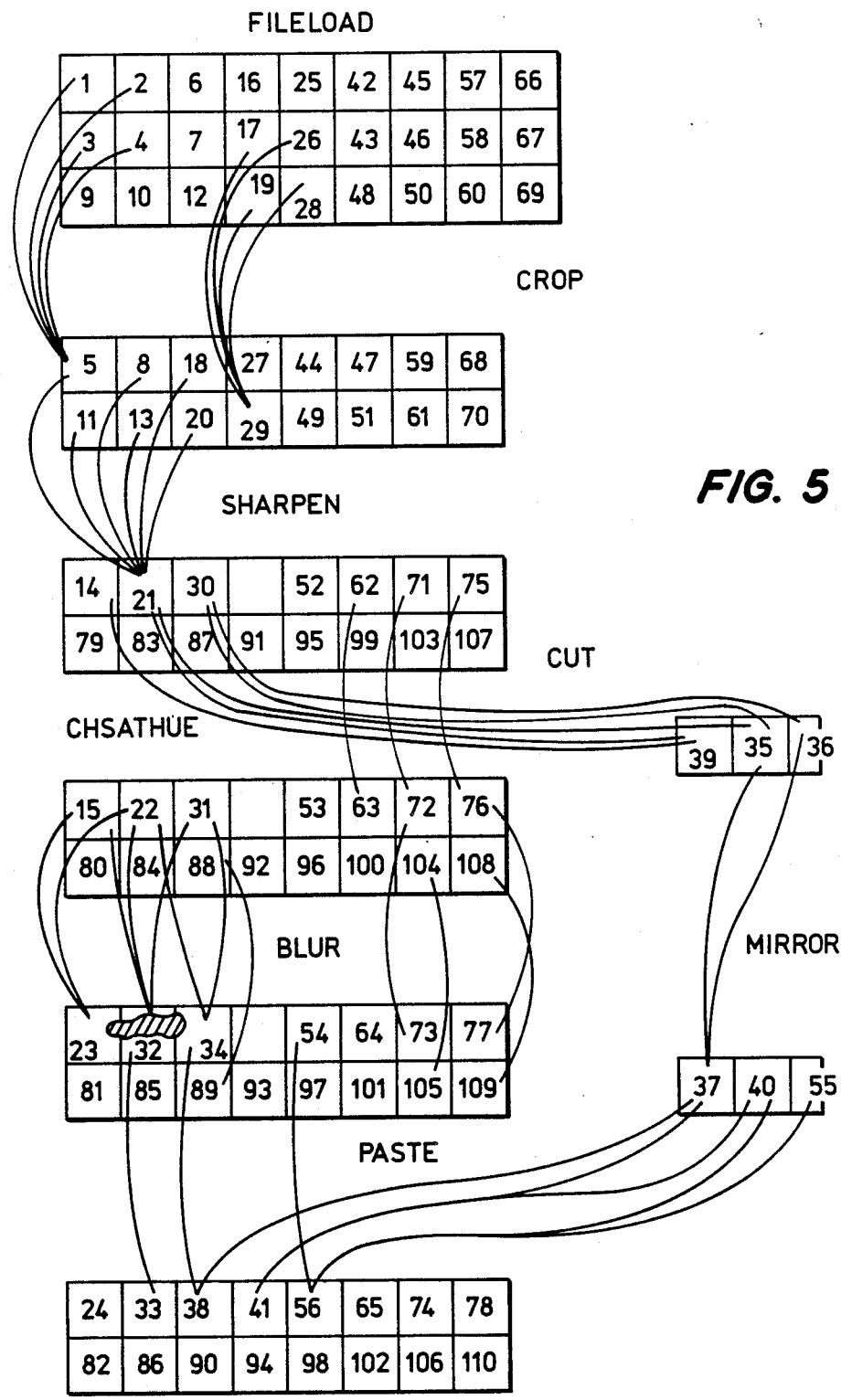
FIG. 5 is a diagram illustrating chunk dependencies for the flow diagram example of FIG. 4.

5. Chunks-Referring to FIG. 5, images and masks will be considered to consist of chunks, which are rectangular sections of the image of uniform size. In the example of FIG. 5, the chunk size is 128×128 pixels. The origin of the array of chunks is commonly, but need not always be, the origin of the image.

In addition a chunk A depends on a chunk B if chunk A cannot be computed without knowing at least some of the data in chunk B. Chunk B is needed for (or supplies) chunk A if chunk A depends on chunk B. An absolute constraint on the order in which chunks are computed is that if chunk A is "needed for" chunk B then (at least part of) chunk A must be computed before chunk B. Equivalently, if chunk B "depends on" chunk A, chunk B must be computed after chunk A.

III. PROCESSING METHODS

One method for organizing the processing of an image is in a demand-driven fashion. That is one could execute, for each chunk of the final image, the following recursive procedure for computing chunks:

Processing method-version 1

• To compute a chunk, first compute all the chunks on which this chunk depends, then execute the appropriate base procedure specified by the log-file operation, applying the operation to the input chunks and producing the desired output chunk.

The problem with this simple procedure is that a given chunk may be needed for later computation of more than one succeeding chunk. The procedure above would cause such a chunk to be computed more than once, an inefficiency we would like to avoid; however, there is no information on which to base a decision whether or not to retain a chunk once it is computed. The easiest way around this difficulty is to do the following:

Processing method-version 2

1. Use the log-file to record all the "depends on" and "needed for" relationships between pairs of chunks;
2. Use the dependency information to determine the order in which chunks should be computed, eliminating any recomputation and minimizing and disk access.
3. Perform the actual computation of each chunk in the specified order; when a chunk is computed, remove that chunk from the "needed for" list of each chunk on which it depends: if the "needed for" list of any of these dependent chunks is now empty, the memory space allocated for that chunk may now be released; when intermediate chunks need to be stored on the disk, use the computation order to determine which chunk will be needed furthest in the future and select that chunk for storing on disk.

This method has a number of problems. First, step 1 computes all the chunk dependencies. However, it may be that not all chunks may be needed. This is especially the case for interactive view generation. We would prefer to compute dependencies only for those chunks which will actually be computed.

Second, not all of a chunk need always be computed. A blurring operation causes chunks to depend on a few pixels or lines of neighboring chunks. We do not necessarily need to compute all of that neighboring chunk.

A third problem, related to the second, is that chunk dependencies extend to neighboring chunks faster than they need to. Suppose we have two successive blurring operations. Image A is blurred to give image B, which is then blurred to give image C. The images will be the same size. Assume that the chunks are also all the same size. Then a chunk of image B will depend on a neighborhood of chunks within A, and a chunk of C will depend on a neighborhood of chunks of image B, and correspondingly, on a larger neighborhood of chunks A. Actually however, the dependency need not move outward so fast. For reasonable kernels, C will depend only on the smaller neighborhood of chunks in A.

So, by treating chunks as entities to be computed entirely or not computed at all we suffer two inefficiencies: we derive chunk dependencies which are unnecessary, and we compute more of some chunks than we need to. The following method avoids these problems.

Processing method-version 3 (preferred version)

1. Process the log file from beginning to end, determining which images are the inputs to each operation and the sizes of the images which result from each operation. Associate with each image a description of what part of that image needs to be computed; this will be empty for all images initially. Also determine the chunk size to be used for each image.

2. Determine which portion of which images are the end result of the computation (because of saves to disk or because they are currently active at the end of the log-file)-this is the "external demand." Add this to the "needs to be computed" description for each such image.

3. Process the list of images in reverse direction, doing the following for each image.

• Using the "needs to be computed" description for the image, determine which chunks have some portion which needs to be computed, and determine what portion of each chunk that is.

• For each chunk (call it chunk Z) which needs to be computed (at least in part), do the following:

Determine which portions of which chunks of other images are needed to compute the desired portion of chunk Z. List those chunks as the list of chunks on which chunk Z depends.

For each chunk (call it chunk Y) on which Z depends, add Z to Y's
list of chunks for which Y is needed (which it supplies).

4. Using the dependencies amoung chunks generated in the previous step, determine the order for the chunks to be computed which eliminates unnecessary computation and reduces disk input and output, generating a list of chunks in the order of computation. An appropriate algorithm which achieves reasonable efficiency without undue complexity is the following:

Determine the set of chunks which are part of the final result of the computation, and initialize the computation order list to contain no chunks.

For each such chunk (iterating over them in a left-to-right, top-to-bottom raster scan) apply the "try-to-schedule" procedure.

The recursive try-to-schedule procedure is the following, for the chunk (call it chunk Z) to which the procedure is being applied: if Z already appears in the computation order list, then return from the procedure; otherwise determine all the chunks on which Z depends (from Z's "depends on" list). For each such chunk (in raster scan order), if any, apply the try-to-schedule procedure. Then add Z to the end of the computation order list.

5. For each chunk (call it Z) in the computation list, in order, -do the following:

• Allocate memory space in which to compute chunk Z and make sure that any chunk on which Z depends is in memory, reading it in from disk if necessary. If there is insufficient free memory available, do the following:

For each chunk (call it chunk A) currently residing in memory do the following: Iterate through the computation list beginning with chunk Z until a chunk (call it $B_A$) is found which depends on chunk A.. Count the number of chunks between Z and $B_A$ (including $B_A$) and call this $t_A$.

If memory space for n chunks is needed, then of the chunks residing in memory, choose the n chunks with the largest $t_A$; store them on disk and free their memory space.

• Calculate the image data for chunk Z, only calculating the portion which is actually needed.

• For each chunk Y on which chunk Z depends, remove Z from Y's "needed for" list, that is, its list of chunks for which it is needed (chunks which it supplies). If Y's "needed for" list is now empty, free the memory space containing the image data for chunk Y.

The discussion above made use of the concept of a description of the portion of an image or chunk which needs to be computed. This description can be simple or complicated, the only requirement being that it include at least the pixels which need to be computed. A very simple description would be that "some of the pixels in this chunk or image need to be computed"; one would then have to compute the whole chunk or image to be sure of having the data for subsequent operations. A very complex description would be to list exactly those pixels which are needed; this would avoid computing any unneeded pixel, but would require auxiliary data structures which could be larger than the image or chunk itself. Our preferred compromise is to record a rectangle which encloses all the needed pixels. Although some unneeded pixels are on occasion computed, the data structure required is simple and of fixed size.

IV. Basic Operations

You will note that for each operation which may be in the log-file we need to be able to do the following:

• Determine, without computing the pixel data of the resulting image or mask, the size of the resulting image or mask (function op—size for each operation op);

• Determine, without computing the pixel data of the resulting image or mask, the chunks of previous images on which a portion of the result depends (function op—dependencies for each operation op);

• Compute a portion of the resulting image or mask, (function op—compute for each operation op).

The sections which follow discuss in detail examples of the type of operations that may be implemented following the teachings of the present invention. Note that many of the interactive operations can be condensed down into a rather simple final specification: the drawing of a tone-scale curve results in a look-up table; painting or brushing with a mouse results in a mask.

The descriptions are accompanied by English or mathematical descriptions of the three operations noted above. These notations are used in the descriptions:

- I[x,y] for the value of pixel x,y (all three color components in the chosen color space such as L*U*V* of the CIELUV color system) of image I.
- $I[x_1..x_2, y_1..y_2]$ denotes the rectangle of pixels of image I for which the x coordinate is in the range $x_1$ to $x_2$ and the y coordinate is in the range $y_1$ to $y_2$;
- $I_{pixels}$, $I_{lines}$ for the number of pixels and lines in a rectangle which encloses image I;
- R is the result image or mask of the operation under consideration;
- mask values range from O (off) to maskmax (on);

For each operation that follows, the operations op_size, op_compute, and op_pixel_dependencies are given. The function op_dependencies which determines dependencies among chunks can be expressed in terms of the function op_pixel_dependencies as follows.

1. Given a chunk R or a portion of an image, determine the pixels which it contains (or which is needed to be computed);
2. Using the functions op_pixel_dependencies, determine the pixels of previous images or masks on which R depends;
3. Determine all chunks $\tilde{R}$ of previous images or masks which contain any of the pixels determined in step 2; those are the chunks on which R depends.

Keep in mind while using the specifications that follow that an image consists of the image data arranged as a rectangle, and any number of masks associated with the image. One of the masks associated with the image is the shape mask, which defines the shape of the image. Obviously if the image is rectangular this need not be implemented as a full array of pixel values, but in concept it is still a mask which defines which pixels in the images bounding rectangle are actually in the image. As one image is computed from another, the associated masks become associated with the new image as well; for some operations the masks are modified or shifted, as described in the following specifications.

In many operations, some parts of the result image may be identical to the corresponding parts of the source image in the sense that the same image data could be used. The preferred implementation allows such identical portions of images to share image data rather than making separate copies of it. This correspondence is implied by the word identical in the specifications.

1. Operation BACKGROUND

This operation creates a new image of given size and color. Its parameters are:
- color, the three-component specification of the color of the new image,
- pixels, the number of pixels in the new image,
- lines, the number of lines in the new image.

function background_size:

$R_{pixels}$=pixels, $R_{lines}$=lines function background_pixel_dependencies:

The new image dependes on no previous images.

function background_compute:

R[x,y]=color for $0 \leq x <$ pixels, $0 \leq Y <$ lines
  one mask (the shape) is associated with the new image.
R[x,y]=maskmax for $0 \leq x <$ pixels, $0 \leq Y <$ lines

2. Operation CHANGE SATURATION AND HUE (CHSATHUE)

This operation alters the saturation and hue of pixels in the image. It may use a mask to control the amount or presence of change. The parameters of the operation are
- I, the source image,
- M, a mask associated with I which controls the amount of change,
- sat_change, the amount of saturation change (1.0=no change),
- hue_change, the amount of hue change (angle by which to rotate hue).

function change_sat_hue_size:

$R_{pixels}=I_{pixels}$, $R_{lines}=I_{lines}$ function change_sat_hue_pixel_dependencies:

rectangle $R[x_1..x_2, y_1..y_2]$ depends on $M[x_1..x_2, y_1..y_2]$ and on $I[x_1..x_2, y_1..y_2]$ function change_sat_hue_compute:

masks associated with R are identical to those associated with I;
using
  satch=1+(sat_change−1)*M[x,y]/maskmax
  huech=(hue_change)*M[x,y]/maskmax
R[x,y].1star=I[x,y].1star
R[x,y].ustar=satch*(cos(huech)*
  I[x,y].ustar+sin(huech)*I[x,y].vstar)
R[x,y].vstar=satch*(−sin(huech)*
  I[x,y].ustar+cos(huech)*I[x,y].vstar)
R is identical to I where M is known to be off.

3. Operation COPY (clone)

This operation copies pixel values from one location in the image to another location, moving pixels a fixed distance and direction. The parameters are:
- I, the source image,
- M, the mask (on or off indicating where values are to be written)
- xdist,ydist, the x and y displacements that the pixels are moved.

function copy_size:

$R_{pixels}=I_{pixels}$, $R_{lines}=I_{lines}$ function copy_pixel_dependencies:

rectangle $R[x_1..x_2, y_1..y_2]$ depends on $M[x_1..x_2, y_1..y_2]$ and, on
$I[x_1..x_2, y_1..y_2]$ where
$M[x_1..x_2, y_1..y_2]$ is not known to be on, and $I[x_1-xdist..x_2-xdist, y_1-ydist..y_2-ydist]$ where
$M[x_1..x_2, y_1..y_2]$ is not known to be off function copy_compute:

the masks associated with R are identical to those associated with I;
R[x,y]=I[x,y]*(1−M[x,y]/maskmax)+
I[x−xdist,y−ydist]*M[x,y]/maskmax
R is identical to I where M is known to be off.

4. Operation CROP

This operation trims off some of the edges of an image. It reduces its size, but does not change the pixel pitch or any individual pixel values. The parameters of the operation are:
- I, the source image,
- result_pixels, the width of the result,
- result_lines, the height of the result,
- start_pixel, the x-coordinate in image I of the first pixel to appear in the result image,

- start_line, the y-coordinate in image I of the first line to appear in the result range.

function crop_size:

$R_{pixels}$=result_pixels, $R_{lines}$=result_lines, function crop_pixel_dependencies:

rectangle R[$x_1..x_2,y_1..y_2$] depends on

I[$x_1$+start−pixel..$x_2$+start−pixel, $y_1$+start−line..$y_2$+start−line]

function crop_compute:

The masks of R are the masks of I cropped in the same way that the image is cropped.

$R[x,y] = I[x+start\_pixel, y+start\_line]$ and similarly for all masks.

5. Operation CUT

This operation creates a new image which is a portion of a source image. The source image is not altered. The portion to be cut is defined by a mask. The parameters of the operation are:

- I, the source image,
- M, the mask indicating what is to be cut, including the values:

$r_x,r_y$, the x and y coordinates of the mask's bounding rectangle, $r_{pixels},r_{lines}$, the number of pixels and lines in the mask's bounding rectangle where outside the bounding rectangle, the mask is known to be off.

This operation has two output images, R and S. One (R) is identical to the source image I, the other (S) is the cut piece.

function cut_size:

$R_{pixels}=I_{pixels}$, $R_{lines}=I_{lines}$ $S_{pixels}=r_{pixels}$, $S_{lines}=r_{lines}$ function cut_pixel_dependencies:

rectangle R[$x_1..x_2,y_1..y_2$] depends on I[$x_1..x_2,y_1..y_2$]

rectangle S[$x_1..x_2,y_1..y_2$] depends on I[$x_1+r_x..x_2+r_x, y_1+r_y..y_2+r_y$] and on M[$x_1+r_x..x_2+r_x, y_1+r_y..y_2+r_y$]

function cut_compute:

image R has the same masks as I and the image data for R is identical to that for I;

the mask M becomes the shape mask for image S after being shifted by ($-r_x,-r_y$) and truncated to the size of image S; S inherits the masks from I after being similarly shifted and cropped;

$S[x,y]=I[x+r_x,y+r_y]$.

6. Operation FILE-LOAD (from disk)

This operation recalls an image or mask from disk. It depends on:

- imagename, the name by which the image is known to the file system;

The size of the new image is the same as the size of the image stored in the disk file. The image has no dependencies on previous chunks. The image (or any chunk or rectangle of it) is computed using the file system's subroutines for recalling all or part of an image. Any masks stored with the image are considered to be associated with the result image.

7. Operation FILE SAVE (to disk)

This operation saves an image and its mask as a disk file. It depends on:

- I, the source image or mask,
- imagename, the name by which the result is to be known to the file system;

The size of the image stored in the disk file is the same as that of the image being saved. The disk file depends on all the chunks of the image being saved. The disk file (or any part of it) is computed by the file system's subroutines for saving all or part of an image. Any masks associated with the image are saved to disk as well.

8. Operation Tonescale (Density adjustments and contrast changes)

This operation changes the contrast and neutral density level of an image, possibly modified by a mask. j The parameters are:

- I, the source image,
- M, a mask associated with image I (an on or off mask),
- lut, the look up table which maps the discrete range of luminance values to new values.

function lut_size:

$R_{pixels}=I_{pixels}$, $R_{lines}=I_{lines}$ function lut_pixel_dependencies:

rectangle R[$x_1..x_2,y_1..y_2$]Depends on M[$x_1..x_2,y_1..y_2$] and on I[$x_1..x_2,y_1..y_2$]

function lut_compute:

the masks associated with R are identical to those associated with I;

$Mv=M[x,y]/maskmax$ $R[x,y]=(mv*lut(I[x,y])$

R is identical to I where M is known to be off

9. Operation MAKE MASK FROM BOUNDARY (MMBOUNDARY)

This operation makes a new mask from a set of boundary specifications. A boundary specification is a list of coordinates which are the vertices of a closed polygon. The sense of in-ness or out-ness (mask on or off) changes when a boundary is crossed. The boundary itself is considered to be part of the inside. The parameters of the operation are: 3p ●I, the source image with which the mask will be associated,

- boundaries, a list of boundary specifications, each of which is a list of coordinate pairs designating a closed polygon;
- sense, on or off indicating whether pixels outside all of the boundaries are on or off The image data, its crop boundaries, and its associated mask are unchanged by this operation, except that one new mask is added. This new mask is defined by the following:

To determine whether a given pixel with coordinates (x,y) is inside or outside the mask defined by a set of boundaries, do the following.

set the state of the mask for that pixel to OUT.

for each line segment of each polygon of the boundary specification, do the following. The coordinates of the end points of the line segments are ($x_1,y_1$) and ($x_2,Y_2$) with $y_2>=y_1$.

(a) if $y<y_1$ or $y_2<y$, do nothing;

(b) if $y_1<y<y_2$ and $(x-x_1)(y_2-y_1)=(x_2-x_1)(y-y_1)$, then set the state for the pixel to BOUNDARY (c) if $y_1<y<y_2$ and $(x-x_1)(y_2-y_1)<(x_2-x_1)(y-y_1)$, then do nothing (d) if $y_1<y<y_2$ and $(x-x_1)(y_2-y_1)>(x_2-x_1)(y-y_1)$, then change the state to OUT if it is IN, and to In if it is OUT (e) if $y=y_2$ and $x\neq x_2$ then change the state to OUT if it is IN, and to IN if it is OUT (f) if $y=y=y_1$, $x\neq x_1$ and $y<y_2$ then do nothing (g) if $y=y_1$ and $x=x_1$ then set the state to BOUNDARY (h) if $y=y_2$ and $x=x_2$ then set the state to BOUNDARY If the state of the pixel is In or BOUNDARY, then give the mask the value of the sense parameter; if the state is OUT, give the mask the value of the complement of the sense parameter.

It will be recognized that this algorithm can be applied to groups of pixel at one time, so that it is not necessary to interate over the list of line segments for each individual pixel.

10. Operation MAKE MASK FROM COLOR SPECIFICATION (MMCOLORSPEC)

This operation makes a mask from a specification of color range, which is a logical condition on the pixel value at each pixel. In this description only logical conditions on the values of luminance, hue and saturation are permitted, though obviously the opertion can be extended to encompass conditions on other aspects of the pixel value or of the neighborhood (e.g. texture, local variance, redness, etc.). The parameters are:

•I, the source image with which the mask will be associated,

•spec, the logical condition to be evaluated for each pixel,

•sense, whether the mask is on or off when the logical condition is true.

The image data and its associated masks are unchanged by this operation, except that one new mask is added. This new mask if defined by:
if (spec(I[x,y]) is true)
    R[x,y] = sense else
    R[x,y] = maskmax − sense

11. Operation MAKE MASK FROM GEOMETRIC OBJECT (MMGEOM, MMRECT)

This operation creates a new mask using a condition on the pixel coordinates, thus permitting geometric objects to be created. The parameters are:

•I, the source image with which the mask will be associated,

•spec, the logical condition to be evaluated for each coordinate location,

•sense, whether the mask is on or off when the logical condition is true.

The image data and its associated masks are unchanged by this operation, except that one new mask is added. This new mask is defined by:
if (spec(x,y) is true)
    R[x,y] = sense else
    R[x,y] = maskmax − sense Possible specs are
•rectangle $(x_1..x_2, y_1..y_2)$: $x_1 \leq x \leq x_2$ and $y_1 \leq y \leq y_2$
•circle with radius r and center $x_c,y_c$: $(x-x_c)^2+(y-y_c)^2 \leq r^2$

12. Operation MAKE MASK FROM LOGICAL OPERATION (MMLOGICAL)

This operation creates a new mask by logically combining the values of other masks. Permitted operations are inversion, union, and intersection. The parameters are:

•I, source image with which the mask will be associated,

•expression, the logical condition to be evaluated for each pixel,

•sense, whether the mask is on or off when the logical expression is true.

The image data and its associated masks are unchanged by this operation, except that one new mask is added. This new mask is defined by:
if (expression(x,y) is true)
    R[x,y] = sense else
    R[x,y] = maskmax − sense

13. Operation MIRROR

This operation does a reflection, 90 degree rotation, or combination on the whole image. It depends on these parameters:

•I, the source image,

•rr, which specifies one of these rotation/reflections:
id: identity (no change)
hr: horizontal reflection (about a vertical axis)
vr: vertical reflection (about a horizontal axis)
in: 180 degree rotation
dr: diagonal reflection (about the upper left to lower right axis)
or: other diagonal reflection (about the upper right to lower left axis)
cw: 90 degree clockwise rotation
cc: 90 degree-counter-clockwise rotation function mirror_size:
    for operations id, hr, vr, in:
        $R_{pixels}=I_{pixels}, R_{lines}=I_{lines}$;
    for operations dr, or, cw, cc:
        $R_{pixels}=I_{lines}, I_{lines}=I_{pixels}$.

function mirror_pixel_dependencies: with
$\tilde{x}_1 = I_{pixels}-1-x_2$
$\tilde{x}_2 = I_{pixels}-1-x_1$
$\tilde{y}_1 = I_{lines}-1-y_2$
$\tilde{y}_2 = I_{lines}-1-y_1$ id: $R[x_1..x_2,y_1..y_2]$ depends on $I[x_1..x_2,y_1..y_2]$
hr: $R[x_1..x_2,y_1..y_2]$ depends on $I[\tilde{x}_1..\tilde{x}_2,y_1..y_2]$
vr: $R[x_1..x_2,y_1..y_2]$ depends on $I[x_1..x_2,\tilde{y}_1..\tilde{y}_2]$
in: $R[x_1..x_2,y_1..y_2]$ depends on $I[\tilde{x}_1..\tilde{x}_2,\tilde{y}_1..\tilde{y}_2]$
dr: $R[y_1..y_2,x_1..x_2]$ depends on $I[x_1..x_2,y_1..y_2]$
or: $R[y_1..y_2,x_1..x_2]$ depends on $I[\tilde{x}_1..\tilde{x}_2,\tilde{y}_1..\tilde{y}_2]$
cw: $R[y_1..y_2,x_1..x_2]$ depends on $I[x_1..x_2,\tilde{y}_1..\tilde{y}_2]$
cc: $R[y_1..y_2,x_1..x_2]$ depends on $I[\tilde{x}_1..\tilde{x}_2,y_1..y_2]$ function mirror_compute:
id: $R[x,y]=I[x,y]$ (R is identical to I)
hr: $R[x,y]=I[I_{pixels}-1-x,y]$
vr: $R[x,y]=I[x,I_{lines}-1-y]$
in: $R[x,y]=I[I_{pixels}-1-x,I_{lines}-1-y]$ dr: $R[y,x]=I[x,y]$ or: $R[y,x]=I[I_{pixels}-1-x,I_{lines}-1-y]$ cw: $R[y,x]=I[x,I_{lines}-1-y]$ cc: $R[y,x]=I[I_{pixels}-1-x,y]$ The masks associated with I are reflected or rotated in the same way as the image data to give the masks associated with R;

14. Operation PAINT COLOR or LUMINANCE (Paint)

This operation mixes (according to a mask) a constant color with the image. As described here, the operation paints all three color components, but could readily be extended to alter only certain of the components (e.g. luminance only or hue only). The parameters are:

•I, the source image,

•M, the mask associated with I which controls the amount of mixing,

•color, the three component specification of the color being painted;

function paint_color_size:
    $R_{pixels}=I_{pixels}, R_{lines}=I_{lines}$ function paint_color_pixel_dependencies:
  rectangle $R[x_1..x_2, y_1..y_2]$ depends on $M[x_1..x_2,y_1..y_2]$ and on $I[x_1..x_2,y_1..y_2]$ where
  $M[x_1..x_2,y_1..y_2]$ is not known to be on (and on $I[x_1..x_2,y_1..y_2]$ everywhere if some of the color components are not being painted)
function paint_color_compute:
  $R[x,y] = color*M[x,y]/maskmax + I[x,y]*(1-M[x,y]/maskmax)$.

The masks associated with R are identical to the masks associated with I.

15. Operation PASTE

This operation inserts an image into a source image. It does not change the size of the source image. It may use a mask to control the transparency or feathering of the pasted image. The parmeters of the operation are:
- I, the source image,
- P, the image being pasted,
- $M_i$, a mask associated with I, or $M_p$, a mask associated with P, which controls transparency,
- start_pixel, the x-coordinate in image I at which to paste pixel (O,O) of image P,
- start_line, the y-coordinate in image I at which to paste pixel (O,O) of image P. p0 function paste_size:
  $R_{pixels} = I_{pixels}, R_{lines} = I_{lines}$.
function paste_pixel_dependencies:
  rectangle $R[x_1..x_2,y_1..y_2]$ depends on $M_i[x_1..x_2,y_1..y_2]$ (or $M_P[\tilde{x}_1..\tilde{x}_2,\tilde{y}_1..\tilde{y}_2]$) and on
  $I[x_1..x_2,y_1..y_2]$ where
  $M_i[x_1..x_2,y_1..y_2]$ (or $M_P[\tilde{x}_1..\tilde{x}_2,\tilde{y}_1..\tilde{y}_2]$) is not known to be on
  and it depends on $P[\tilde{x}_1..\tilde{x}_2,\tilde{y}_1..\tilde{y}_2]$ where $M_i[x_1..x_2,y_1..y_2]$ (or
  $M_P[\tilde{x}_1..\tilde{x}_2,\tilde{y}_1..\tilde{y}_2]$ is not known to be off where
  $\tilde{x}_1 = x_1 - start\_pixel$
  $\tilde{x}_2 = x_2 - start_{13} pixel$
  $\tilde{y}_1 = y_1 - start\_line$
  $\tilde{y}_2 = y_2 - start\_line$
function paste_compute:
  $R[x,y] = I[x,y]*(1-M_i[x,y]/maskmax) + P[\tilde{x},\tilde{y}]*M_i[x,y]/maskmax$ or
  $R[x,y] = I[x,y]*(1-M_P[\tilde{x},\tilde{y}]/maskmax) + P[\tilde{x},\tilde{y}]*M_P[\tilde{x},\tilde{y}]/maskmax$ where
  $\tilde{x} = x - start\_pixel$
  $\tilde{y} = y - start\_line$ R is identical to I where $M_i$ (or $M_P$, shifted) is off;

The masks associated with R are identical to those associated with I, except that R may have an additional mask which is $M_P$ shifted by (start_pixel, start_line).

16. Operation RESIZE

This operation resizes (enlarges or reduces) an image to a new number of pixels and lines. The parameters are:
- I, the source image,
- $f_x$, the scale factor in the x direction
- $f_y$, the scale factor in the y direction
- kernel, a specification of the kernel to be used to do the resizing, including the values (the kernel size may depend on the scale factors)
  k_left, the extent of the kernel to the left,
  k_right, the extent of the kernel to the right,
  k_up, the extent of the kernel vertically up,
  k_down, the extent of the kernel vertically down
NOTE: nint is the nearest integer function
In the following:

$q_x(x) = x/f_x$
$q_y(y) = y/f_y$
function resize_size:
  $R_{pixels} = nint(f_x \cdot I_{pixels}), R_{lines} = nint(f_y \cdot I_{lines})$
function resize_pixel_dependencies:
  rectangle $R[x_1..x_2,y_1..y_2]$ depends on
  $I[q_x(x_1)-k\_left..q_x(x_2)+k\_right, q_y(y_1)-k\_top..q_y(y_2)+k\_bottom]$
function resize_compute:

$$R[x,y] = \sum_{\tilde{x}=-k\_left}^{k\_right} \sum_{\tilde{y}=-k\_top}^{k\_bottom} I[nint(x_s) + \tilde{x}, nint(y_s) + \tilde{y}]_s kernel(\delta + \tilde{x}, \delta_x + \tilde{y})_y$$

where
  $\delta_x = nint(x_s) - x_s$, $\delta_y = nint(y_s) - y_s$
  $x_s = q_x(x)$, $y_s = q_y(y)$ the mask associated with R are the masks associated with I, resized in the same way as the image data.

In the equations above
  $I[x,y] = I[0,y]$ if $x < 0$
  $I[x,y] = I[I_{pixels}-1,y]$ if $x \geq I_{pixels}$
  $I[x,y] = I[x,0]$ if $y < 0$
  $I[x,y] = I[x,I_{lines}-1]$ if $y \geq I_{lines}$

17. Operation ROTATE

This operation does rotations by arbitrary angles of the whole image (rotations by multiples of 90 degrees are performed by MIRROR). The shape of the image also rotates. The parameters of the operation are:
- I, the source image,
- $x_o, y_o$ and x and y coordinates of the point in image I (not necessarily a pixel position) about which the rotation is to be performed,
- angle, the angle (in degrees, positive is clockwise) to rotate,
- kernel, a specification of the kernel to be used to do the rotating, including the values:
  k_left, the extent of the kernel to the left,
  k_right, the extent of the kernel to the right,
  k_up, the extent of the kernel vertically up,
  k_down, the extent of the kernel vertically down,
NOTE: nint is the nearest integer function; $M_i$ is the shape mask for image I;
In the following:
  $x_{rot}(x,y,angle) = x \cos angle + y \sin angle$
  $y_{rot}(x,y,angle) = -X \sin angle + y \cos angle$
  $x_{min}(M,x_c,y_c,angle) = \min_{M[x,y] on} Xrot(x-x_c,y-y_c,angle)$
  $x_{max}(M,x_c,y_c,angle) = \max_{M[x,y] on} Xrot(x-x_c,y-y_c,angle)$
  $y_{min}(M,x_c,y_c,angle) = \min_{M[x,y] on} Yrot(x-x_c,y-y_c,angle)$
  $y_{max}(M,x_c,y_c,angle) = \max_{M[x,y] on} Yrot(x-x_c,y-y_c,angle)$
  $x_n = x_o - x_{min}(M_i,x_o,y_o,angle)$
  $y_n = y_o - y_{min}(M_i,x_o,y_o,angle)$
  function rotate_size:
    $R_{pixels} = nint(x_{max}(M_i,x_o,y_o,angle)) - nint(x_{min}(M_i,x_o,y_o,angle))$
    $R_{lines} = nint(y_{max}(M_i,x_o,y_o,angle)) - nint(y_{min}(M_i,x_o,y_o,angle))$
  function rotate_pixel_dependencies: rectangle $R[x_1..x_2,y_1..y_2]$ depends on $I[\tilde{x}_1-k\_left..\tilde{x}_2+k\_right, \tilde{y}_1-k\_top..\tilde{y}_2+k\_bottom]$
  where $\tilde{x}_1 = x_o + x_{min}(\tilde{M}, x_n, y_n, angle)$
$\tilde{x}_2 = x_o + x_{max}(\tilde{M}, x_n, y_n, angle)$
$\tilde{y}_1 = y_o + y_{min}(\tilde{M}, x_n, y_n, angle)$
$\tilde{y}_2 = y_o + y_{max}(\tilde{M}, x_n, y_n, angle)$ where $\tilde{M}$ is the intersection of the rotated version of $M_i$ and the rectangle $[x_1..x_2, y_1..y_2]$
function rotate_compute:

$$R[x,y] = \sum_{\tilde{x}=-k\_left}^{k\_right} \sum_{\tilde{y}=-k\_top}^{k\_bottom} I[\text{nint}(x_r) + \tilde{x}, \text{nint}(y_r) + \tilde{y}] \text{ kernel}(\delta_x + \tilde{x}, \delta_y + \tilde{y})$$

where
$\delta_x = \text{nint}(x_r) - x_r$, $\delta_y = \text{nint}(y_r) - y_r$
and
$x_r = x_o + x_{rot}(x - x_n, y - y_n, -angle)$
$y_r = y_o + y_{rot}(x - x_n, y - y_n, -angle)$ The masks associated with R are the masks associated with I rotated in the same way that the image data is rotated.

In the equations above:
$I[x,y] = I[0,y]$ if $x < 0$
$I[x,y] = I[I_{pixels}-1, y]$ if $x \geq I_{pixels}$
$I[x,y] = I[x,0]$ if $y < 0$
$I[x,y] = I[x, I_{lines}-1]$ if $y \geq I_{lines}$

18. Operations SHARPEN AND BLUR

These operations sharpen or blur an image in the amount indicated by a mask. The parameters are:
- I, the source image,
- M, mask associated with image I,
- strength, the amount of sharpening or blurring,
- kernel, the kernel with which to do the sharpening or blurring, including the values
  k_left, the extent of the kernel to the left,
  k_right, the extent of the kernel to the right,
  k_up, the extent of the kernel vertically up,
  k_down, the extent of the kernel vertically down.

function sharpen_blur_size:
  $R_{pixels} = I_{pixels}$, $R_{lines} = I_{lines}$
function sharpen_blur_pixel_dependencies:
  rectangle $R[x_1..x_2, y_1..y_2]$ depends on $M[x_1..x_2, y_1..y_2]$ and on $I[x_1-k\_left..x_2+k\_right, y_1-k\_top..y_2+k\_bottom]$ where $M[x_1..x_2, y_1..y_2]$ is not known to be off, but only on $I[x_1..x_2, y_1..y_2]$ where $M[x_1..x_2, y_1..y_2]$ is known to be off
function sharpen_blur_compute:
  The masks associated with R are identical to the masks associated with I;
  $R[x,y] = I[x,y] + \text{strength}*(\tilde{R}[x,y]*M[x,y]/\text{maskmax} + I[x,y]*(1 - M[x,y]/\text{maskmax}) - I[x,y])$ where $$\tilde{R}[x,y] = \sum_{\tilde{x}=-k\_left}^{k\_right} \sum_{\tilde{y}=-k\_top}^{k\_bottom} I[x-\tilde{x}, y-\tilde{y}] \cdot \text{kernel}(\tilde{x},\tilde{y})$$

R is identical to I where M is off.
In the equations above
$I[x,y] = I[0,y]$ if $x < 0$
$I[x,y] = I[I_{pixels}-1, y]$ if $x \geq I_{pixels}$
$I[x,y] = I[x,0]$ if $y < 0$
$I[x,y] = I[x, I_{lines}-1]$ if $y \geq I_{lines}$

19. Operation SHIFT COLOR and LUMINANCE (Balance)

This operation applies a color and luminance shift to pixels of the image. It may use a mask to control the amount or presence of change. The parameters of the operation are:
- I, the source image,
- M, the mask associated with I which controls the amount of change,
- l_change, the amount of shift in the lightness coordinate,
- u_change, the amount of shift in the u* coordinate,
- v_change, the amount of shift in the v* coordinate, function shift_color_size:
  $R_{pixels} = I_{pixels}$, $R_{lines} = I_{lines}$
function shift_color_pixel_dependencies: rectangle $R[x_1..x_2, y_1..y_2]$ depends on $M[x_1..x_2, y_1..y_2]$ and on $I[x_1..x_2, y_1..y_2]$,
function shift_color_compute:
  $R[x,y] \cdot lightness = I[x,y] \cdot lightness + l\_change*M[x,y]/maskmax$
  $R[x,y] \cdot ustar = I[x,y] \cdot ustar = u\_change*M[x,y]/maskmax$
  $R[x,y] \cdot vstar = I[x,y] \cdot vstar + v\_change*M[x,y]/maskmax$ R is identical to I where M is off.
The masks associated with R are identical to those associated with I.

20. Operation STRETCH

This operation stretches an image either horizontally or vertically by replicating a column of pixels or a line, either at the edge of an image or within the image. The parameters of the operations are:
- I, the source image,
- hv, whether the stretch is horizontal or vertical,
- pl, the number of the pixel or line to replicate,
- nrep, the number of times to replicate the column or row (nrep=0 causes no change to the image)

In the following:

$$s(k) = \begin{cases} k & \text{if } k < p1 \\ p1 & \text{if } p1 \leq k \leq p1 + nrep \\ k = nrep & \text{if } p1 + nrep < k \end{cases}$$

Horizontal stretches:
function stretch_size:
  $pixels(R) = pixels(I) = nrep$, $lines(R) = lines(I)$
function stretch_pixel_dependencies:
  rectangle $R[x_1..x_2, y_1..y_2]$ depends on $I[s(x_1)..s(x_2), y_1..y_2]$
function stretch_compute:
  $R[x,y] = I[s(x), y]$;
The masks associated with R are those associated with I, stretched in the same way that the image is.
Vertical stretches:
function stretch_size:
  $pixels(R) = pixels(I)$, $lines(R) = lines(I) = nrep$
function stretch_pixel_dependencies:
  rectangle $R[x_1..x_2, y_1..y_2]$ depends on $I[x_1..x_2, s(y_1)..s(y_2)]$
function stretch_compute:
  $R[x,y] = I[x, s(y)]$;
The masks associated with R are those associated with I, stretched in the same way that the image is.

21. Make Image from Mask (IMAGEFROMMASK)

This operation converts a mask into an image. The one parameter is the input mask, $M_I$.

function make_image_from_mask_size:
  $R_{pixels} = M_{pixels}$
function make_image_from_mask_pixel dependencies:
  rectangle $R[x_1..x_2, y_1..y_2]$
  depends on $M[x_1..x_2, y_1..y_2]$
function make_mask_from_image_compute:

The value of each pixel of the new image is the value of the mask at the corresponding pixel, converted to a neutral (non-colored) value in such a way that the range of mask values (from minimum to maximum) is converted to the full range of luminance values. The color components are set to values giving neutral colors.

22. Make Mask from Image (MMIMAGE)

This operation converts an image to a mask and associates it with the base image. The input image may be arbitrarily aligned with the new image. The parameters of the operation are:
- an input image
- a base image
- an x and y position The resulting image is the base image unmodified except for the addition of one mask. The position of that mask with respect to the base image is given by the x and y postion parameters. The value of each pixel of the mask is the luminance value from the input image, with the luminance values scaled so that the range of luminance values maps into the range of mask values.

23. Delete Mask

This operation drops a mask from an image. The parameters are:
- an input image
- a mask identifier The resulting image is the same as the input image, except that it has one less mask. The one that is missing is the one identified by the mask identifier.

24. Make a mask by brushing (MMBRUSH)

This operation creates a new mask based on movements of an interactive device such as a mouse or joystick. The user interface to the system is responsible for creating a complete description of the user's movements. This operation then uses that description to create a new mask for the input image. Thus the resulting image is identical to the input image except for the addition of one mask.

The description of the interactive motions can take several forms.

(1) One form is a list of coordinate locations that the locater device passed over. This is convenient for recording but less convenient for computation.

(2) A second form is an array of numbers. The dimensions of the array correspond to the maximum extent covered by the locater device in the course of its movements. The value of each element in the array is the number of times the locater passed over the corresponding pixel, multiplied by a user specified scale factor. This value becomes the value of the mask. The size of the mask is the size of the array.

V. EXAMPLE

An example of the method of the present invention will now be discussed in conjunction with FIGS. 4 and 5 and the OPERATIONS LOG EXAMPLE table. The first command of the operations log example is FILELOAD which command directs the disk file 18 to load a specific image, in this example image I15 into the processor for display. The next operation is identified as CROP which cropping identifies the image width IW, the image height IH, the x starting pixel and the y starting pixel. In FIG. 4 the image to be cropped is identified as 200 and is extracted from the full image I15. Note in FIG. 5 the original FILELOAD consists of chunks of pixels that are numerically defined.

The CROP image segment is shown formed from a lesser number of chunks with connecting links indicating which chunks are needed from the fully loaded image in order to enable the cropping operation to be computed. For example, chunk 5 is dependent on chunks 1, 2, 3 and 4 from the FILELOAD. For clarity, only some of the links identifying dependencies are shown.

The next operation, from the operations log is a sharpen function wherein the image is sharpened using a mask M1 and the shapenning is applied with the strength of 3. In FIG. 4, the sharpening operation is identified by block 202 and in FIG. 5, the chunks needed for the sharpening operation are shown, along with some of the interconnecting lines of dependency on the chunks needed from the cropping operation, and in turn from the FILELOAD operation. From the sharpened image 202, a cut image 204 is to be extracted and masked with a rectangle as indicated by MMRECT. It is saved in disk file 18 with a name I20.

The next operation is CHSATHUE which is an operation for changing the saturation and hue of the preceding image. This is accomplished in block 207 on the image identified as 212. Additionally, on that image there is an MMBRUSH operation to be performed. The next defined operation is a BLUR, which produces a bluring 214 on an image I21 the image 214 in the block 208.

The next operation is for a FILESAVE which operation directs all of the chunks and associated pixels to the disk file 18 for storage. The next operation is a FILELOAD which loads an image file I20, represented by block 201 into the processor for interactive operations.

The next operation is MIRROR, which reverses the order of the pixel elements of image I20 into the mirror version I22 represented by block 206. The next operation called for is the FILESAVE, which indicates that the image file 22 is stored in disk memory 18.

The next operation is to FILELOAD the image I21 which makes the image available for interactive activity which in the OPERATIONS LOG consists of a pasting operation wherein the mirrored image I22 from operation 206 is pasted onto the image I21. the composite image is then FILESAVED in disk 18 and identified as image I30. As can be seen in FIG. 5, the final image is formed from chunks of the original image wherein certain of the chunks are computed and modified by preceding operations which may reflect back through each operation level. Also some chunks in some intermediate images did not need to be computed at all.

Figure 6:
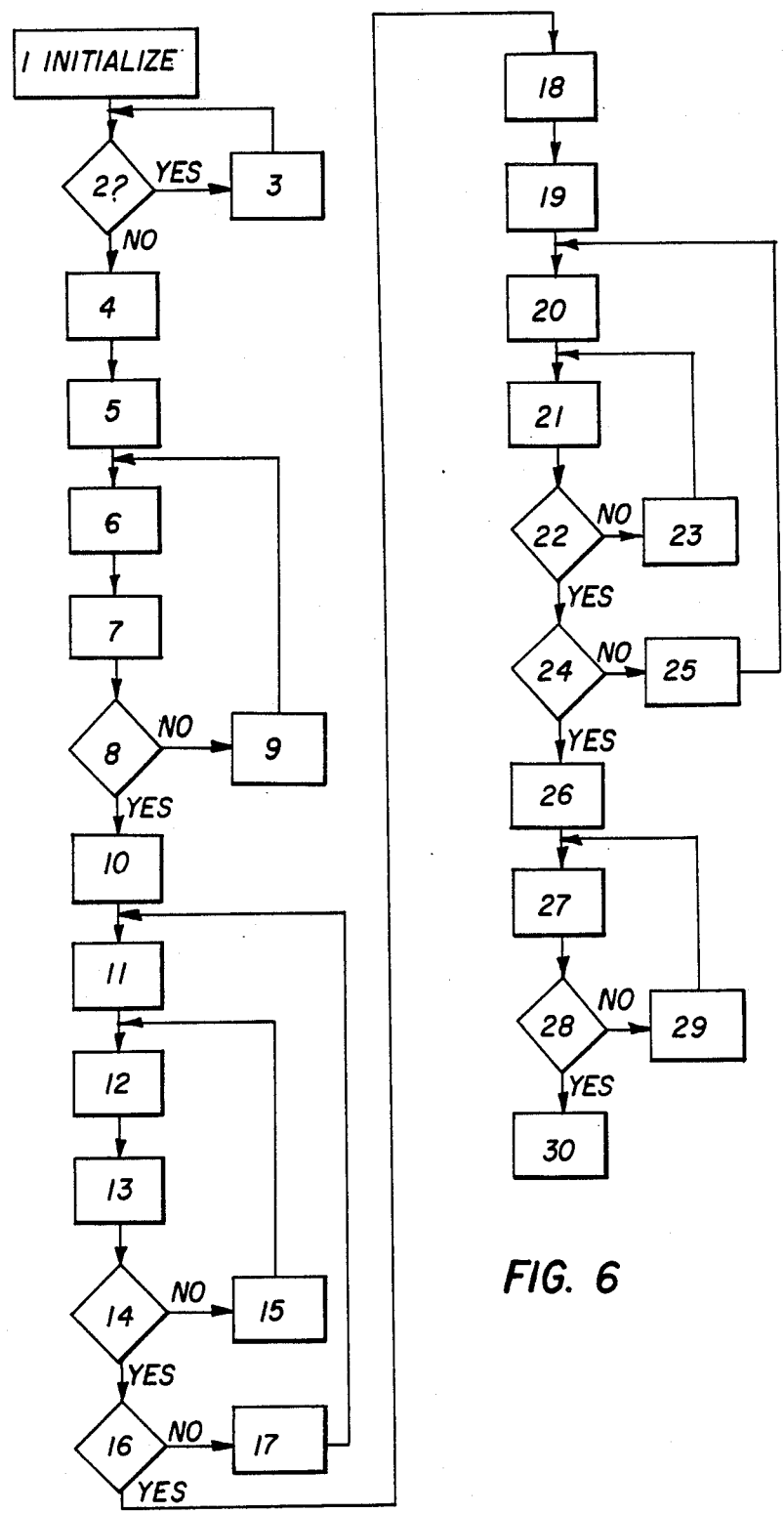
FIG. 6 is a flow chart illustrating the Initialize function.
Figures 7, 8:
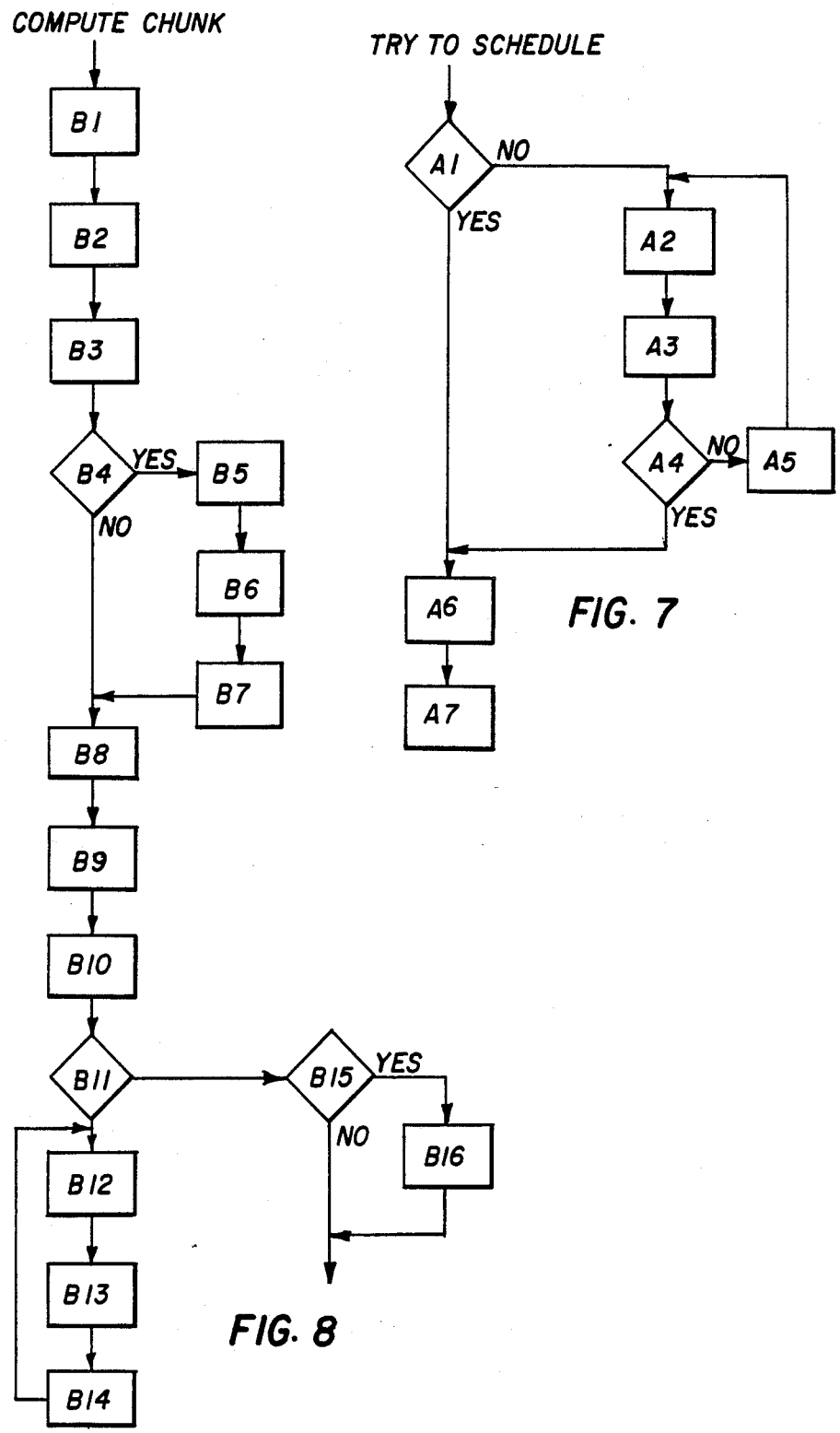
FIG. 7 is a flow chart illustrating the TRY-TO-SCHEDULE function.
FIG. 8 is a flow chart illustrating the COMPUTE_CHUNK function.

FIGS. 6, 7 and 8 are flow charts illustrating the steps of the Initialize, TRY_TO_SCHEDULE, and COMPUTE_CHUNK functions. respectively. Each flow chart contains a number, or a letter and a number identifying it with a line item of the following program steps.

1. Initialize

Set the image_mask_descriptor_list to be an empty list.

2. Any more entries in the log file?

3. Add appropriate descriptors to the end of the image_mask_descriptor_list.

Add a descriptor for each image of mask which the operation produces.

Each descriptor contains
   a. the operation and parameters which produce this image or mask
   b. the input images and masks which are the arguments of the operation
   c. the size of the resulting image or mask
   d. the needed_portion of the image or mask (set to empty)
   e. a reference to the descriptor before it in the image_mask_descriptor_list 4. Determine external demand Identify the descriptors which correspond to the images and masks which are the result of the computation. Set the needed_portion of those descriptors to indicate the pixels of the image or mask which are to be computed.

5. Set the current_descriptor to be the last descriptor in the image_mask_descriptor_list.

6. Determine the chunks of the current_descriptor.

Divide the pixels of the current_descriptor into reasonable sized chunks (e.g. 128 pixels by 128 lines). Each chunk contains the following information:
   a. its needed_portion (set to empty)
   b. depends_on_list, a list of chunks on which the given chunk depends (set to empty)
   c. needed_for_list, a list of chunks for which the given chunk is needed (set to empty)
   d. reference to pixel data for the chunk (set to a NULL reference)

7. Set the needed_portion of each chunk

Set the needed_portion of each chunk of the current_desriptor to be the intersection of the pixels in the chunk and the pixels in the needed_portion of the current_descriptor.

8. Is the current_descriptor the first descriptor in the image_mask_descriptor_list?

9. Set the current_descriptor to be the descriptor prior to itself.

10. Set the current_descriptor to be the last descriptor in the image_mask_descriptor_list.

11. Set the current_chunk to be the first chunk of the current_descriptor.

12. Determine the dependencies of current_chunk.

Using the op_dependency functions for the operation producing the current_descriptor and the needed_portion of the current_chunk, determine the descriptors of the images and masks on which the current_chunk depends and, for each of those descriptors, the needed_portion of that descriptor which is needed in order to compute the needed_portion of the current_chunk.

13. Update the chunk lists.

Create a list of all chunks which
    (a) belong to a dependent image or mask descriptor as determined in the previous step; and
    (b) have a non-empty intersection with the needed_portion of the image or mask descriptor from the previous step. (call this intersection the additional_needed_portion for the chunk).

For each dependent_chunk on this list,
    (a) Add dependent_chunk to the depends_on_list of current_chunk
    (b) add current_chunk to the needed_for_list of dependent_chunk
    (c) enlarge the needed_portion of dependent_chunk to include its additional_needed_portion Delete this list.

14. Is current_chunk the last chunk of current_descriptor?

15. Set current_chunk to be the next chunk of current_descriptor.

16. Is the current_descriptor the first descriptor in the image_mask_descriptor_list?

17. Set the current_decriptor to be the descriptor prior to itself.

18. Initialize the compute_order_list to be empty.

19. Set the current_descriptor to be the last descriptor in the image_mask_descriptor_list.

20. Set the current_chunk to be the first chunk of the current_descriptor.

21. Apply function TRY_TO_SCHEDULE to current_chunk.

22. Is current_chunk the last chunk of current_descriptor?

23. Set current_chunk to be the next chunk of current_descriptor.

24. Is the current_descriptor the first descriptor in image_mask_descriptor_list?

25. Set the current_descriptor to be the descriptor prior to itself.

26. Set current_chunk to be the first chunk on the compute_order_list.

27. Apply function COMPUTE_CHUNK to current_chunk.

28. Is current_chunk the last element of the compute_order_list?

29. Set current_chunk to be the next chunk on the compute_order_list.

30. Copy image and mask data from the appropriate chunks to format the result images and masks.

Function TRY_TO_SCHEDULE (chunk_C):

A1. Is the depends_on_list of chunk_C empty?

A2. Set chunk_A to be the first chunk of the depends_on_list of chunk_C.

A3. Apply function TRY_TO_SCHEDULE to chunk_A.

A4. Is chunk_A the last chunk on the depends_on_list of chunk_C?

A5. Set chunk_A to be the next chunk on the depends_on_list of chunk_C.

A6. Add chunk_C to the end of the compute_order_list.

A7. Return to calling routine

Function COMPUTE_CHUNK (current_chunk):

B1. Set the value of space_needed to 1.

B2. Adjust value of space_needed.

For each chunk which is on the depends_on_list of current_chunk and is not currently in memory, add 1 to space_needed.

B3. Determine available_space.

Set available_space to be the number of chunks which can fit into the available free memory.

B4. Space_needed > available_space?

B5. Determine in_memory_list.

Create a list of all chunks which are currently in memory.

B6. Determine when needed.

For each chunk (call it A) on the in_memory_list, count the number of chunks on the compute_order_list which are between A and the first chunk on the compute_order_list which is
  (a) after the current_chunk on the compute_order_list and
  (b) on the needed_for_*list of A*.

Call this value tA for chunk A.

B7. Move chunks out of memory.

Move the pixel data of the '(space_needed-available_space)' chunks with the largest values of tA out of memory, releasing the memory space occupied by their pixel data.

B8. Allocate memory space for the data of current_chunk.

B9. Move inputs into memory.

Move each chunk which is on the depends_on_list of current_chunk and is not currently in memory into memory.

B10. Compute all the pixels in the needed_portion of current_chunk.

B11. Is the depends_on_list of current_chunk empty?

B12. Set dependent_chunk to equal to an element of the depends_on_list of current_chunk.

B13. Remove dependent_chunk from the depends_on_list of current_chunk.

B14. Remove current_chunk from the needed_for list of dependent_chunk.

B15. Is the needed_for list of dependent_chunk empty?

B16. Release chunk data.

Release the memory space occupied by the pixel data of dependent_chunk.

While there has been disclosed what is considered to be the preferred embodiment of the invention, it will be manifest that many changes and modifications may be made therein without departing from the essential spirit of the invention.

I claim:

1. A method for doing interactive image processing operations on large images comprising the steps of:
    forming a sequential order operations log of each and every sequential operation desired to be performed on the large image;
    converting the large image to an array of pixel elements;
    determining which pixel elements are to be used for each operation in the operations log;
    placing the determined pixel elements in an order for computation by processing through the operations log in a reverse sequential order to determine which groups of pixel elements are needed for successive processing steps; and
    processing through each sequential operation of the operations log in order computing only those pixel elements which are needed for succeeding operations, and deleting them when any succeeding operations which have need of them are completed.

2. A method for doing interactive image processing operations on large images using a digital computer with addressable memory comprising the steps of:
    storing a large image as an array of pixel elements in an addressable memory;
    forming an operations log of each operation that is to be performed on the large image;
    determining which groups of pixel elements are to be used for each operation in the operations log;
    forming chunks of pixels from each group of pixel elements;
    processing through the operations log in a reverse sequential order and determining for each operation which chunks need to be computed and upon which other chunks a computation depends;
    determining an efficient order of chunk computation;
    allocating memory space in said addressable memory in which to compute each chunk; and
    processing through the operations log in sequential order deleting each chunk on which dependency no longer exists.

3. A method for doing interactive image processing operations on large images to provide a final image comprising the steps of:
    (a) determining what portion of the final image is to be displayed;
    (b) forming a sequential order operations log of all operations to be performed on an image to arrive at the final image;
    (c) proceeding through the operations log in a reverse sequential order determining which pixels are needed as inputs for each operation;
    (d) proceeding through the operations log in a sequential order, determining that group of pixels which is needed for later operations and which is part of the image which represents all the operations thus far in the operations log;
    (e) dividing these pixels into chunk groups;
    (f) determining which chunks are dependent on which previous chunks;
    (g) computing chunks in any order except that chunks which are dependent on previous chunks are computed after the previous chunks; and
    (h) deleting chunks when they are no longer needed.

4. A method for doing interactive image processing operations on large digital images to provide an output image comprising the steps of:
    forming a sequential order operations log of each operation that is to be performed on a large digital image;
    determining which pixels of the digital image must be computed in order to obtain the output image by processing through the operations log in a reverse sequential order;
    placing the determined pixels in an order to minimize the amount of storing by forming chunks of dependent pixels and by calling from storage only those chunks that are needed for the final result.

5. A method for doing interactive image processing operations on large digital images according to claim 4 and further comprising the step of:
    processing through the operations log in a sequential order to provide a processed image.

6. A method for interactive image processing operations on large digital images according to claim 5 further comprising the step of:
    deleting from storage used chunks when they are no longer needed.

7. A method for doing interactive image processing operations on large images comprising the steps of:

(a) forming a sequential order operations log of each operation a user wishes to perform on an image;
(b) processing through the operations log in a reverse sequential order to determine which portions of the image are needed to complete all operations;
(c) storing only those portions of the image detemined in step (b); and
(d) processing through the operations log in a sequential order operating upon the image portions stored in step (c).

8. A method for interactively processing large images comprising the steps of:
(a) forming an operations file of all operations to be performed on an image to provide an output image;
(b) processing the operations file from beginning to end, determining which images are needed as inputs to each operation and the sizes of the images that will result from each operation;
(c) associating with each image a description of what portions of the image needs to be computed;
(d) determining which portion of which images will be computed by step c:
(e) computing all portions on which other portions depend; and
(f) performing all operations of the operations file to produce the output image.

9. A method for interactively processing large images comprising the steps of:
(a) forming an operations file of all operations to be performed on an image to provide an output image;
(b) processing the operations file from beginning to end, determining which images are needed as inputs to each operation and the sizes of the images that will result from each operation;
(c) forming each image into chunks;
(d) determining the order in which chunks are to be computed based on dependency;
(e) eliminating any recomputations;
(f) performing the computations in order and removing chunks that are not needed for further computations; and
(g) performing all operations of the operations file using the computed chunks to provide the output image.

10. A method for interactively processing large images comprising the steps of:
(a) forming an operations file of all operations to be performed, in order, on an image to provide an output image;
(b) processing the operations file from beginning to end, determining which images are needed as inputs to each operation, and the sizes of the images that will result from each operation;
(c) forming chunks of each image;
(d) determining which portion of which images will be computed by each operation;
(e) processing the images in an end to beginning order of the operations file, performing the following for each image;
(i) determining which chunks have some portion which needs to be computed based on the determined portion of the image which needs to be computed of step (b);
(ii) determining for each chunk needing to be computed which portions of which chunks of other images are needed to compute the chunks of step (i);
(f) determining the order for the computation of determined chunks of steps (i) and (ii) which eliminates unnecessary computations; and
(g) performing all operations of the operations file to provide an output image.

* * * * *